Patented Feb. 6, 1923.

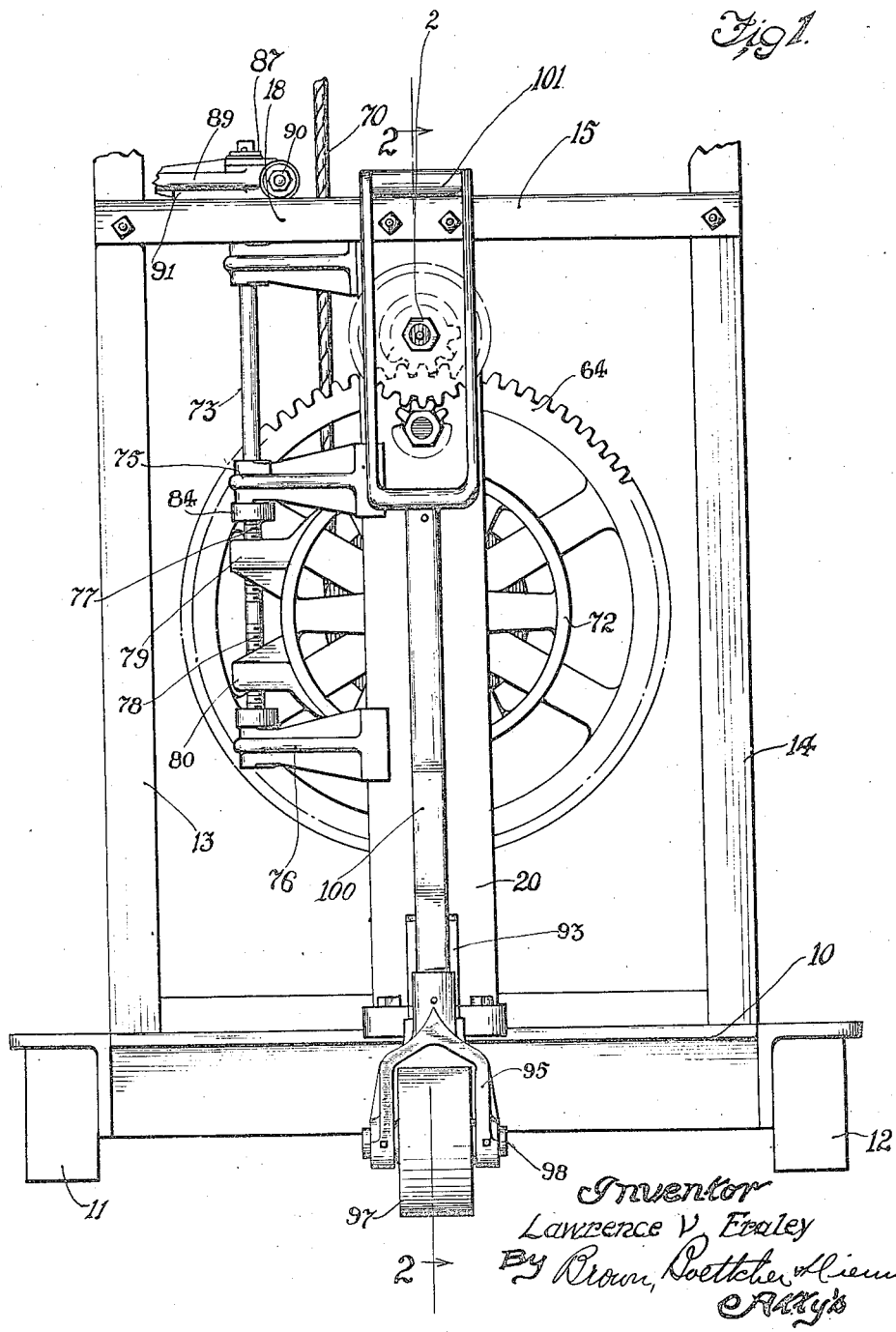

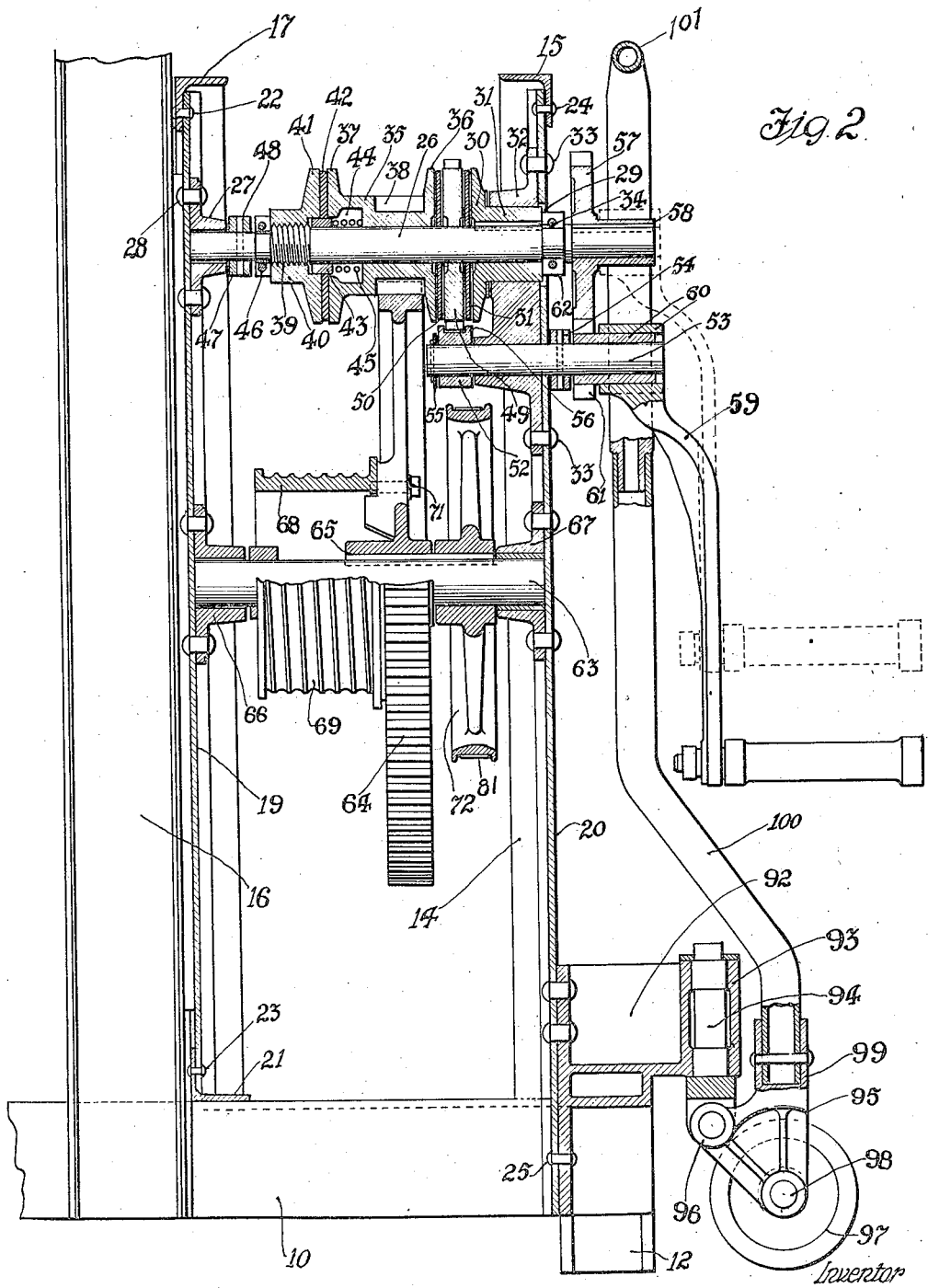

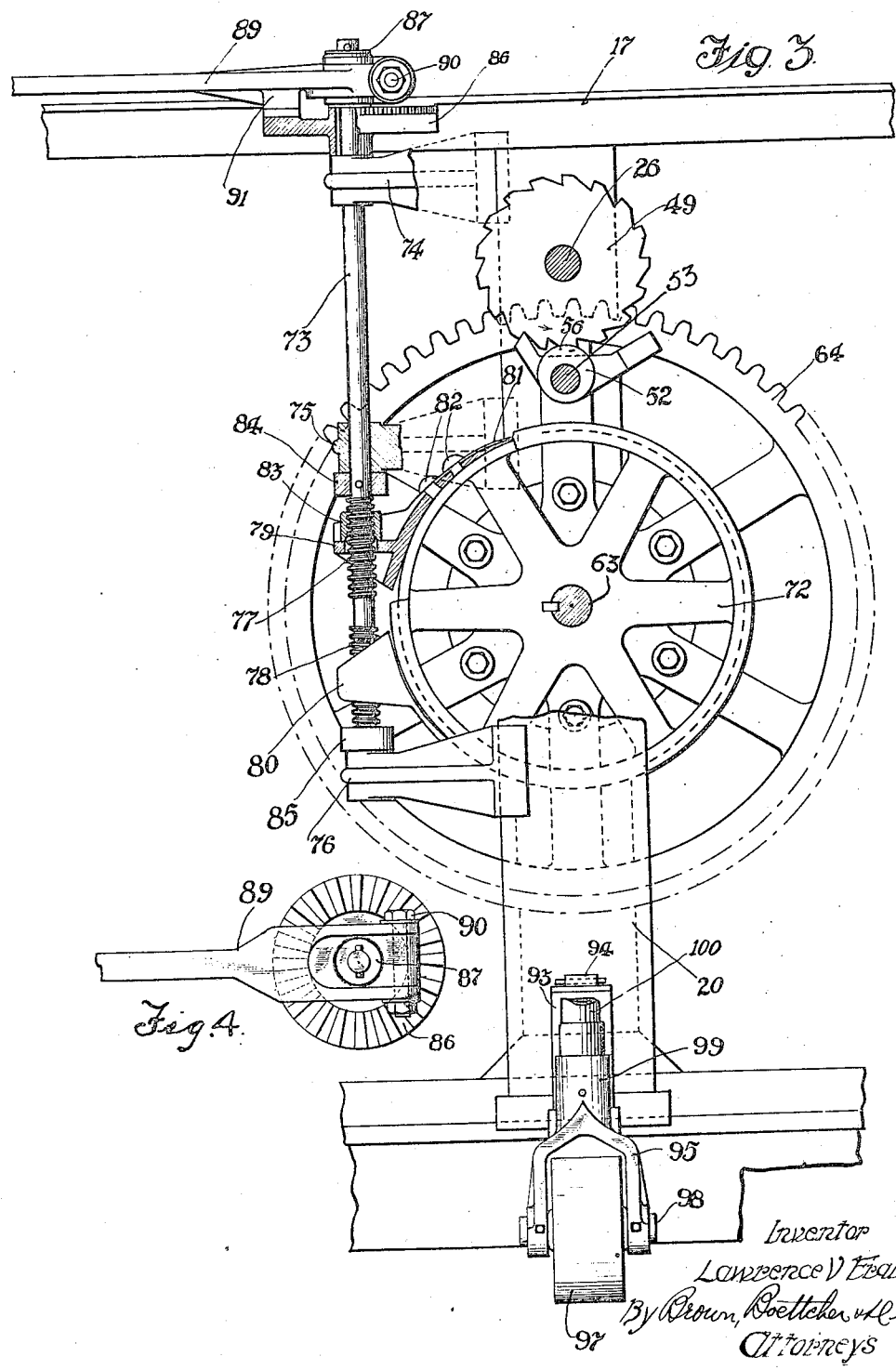

1,444,737

UNITED STATES PATENT OFFICE.

LAWRENCE V. FRALEY, OF CHICAGO, ILLINOIS, ASSIGNOR, BY MESNE ASSIGNMENTS, TO STANDARD CONVEYOR COMPANY, OF NORTH ST. PAUL, MINNESOTA, A CORPORATION OF MINNESOTA.

PORTABLE HOIST.

Application filed January 26, 1920. Serial No. 353,917.

*To all whom it may concern:*

Be it known that I, LAWRENCE V. FRALEY, a citizen of the United States, residing at Chicago, in the county of Cook and State of Illinois, have invented a certain new and useful Improvement in Portable Hoists, of which the following is a full, clear, concise, and exact description, reference being had to the accompanying drawings, forming a part of this specification.

The present invention relates to improvements in portable elevators.

An object of my invention is to provide an elevator for use in warehouses and the like, which is an improvement, economically, in cost of manufacture, and in mode of operation over the devices of the prior art. In the prior art various devices of this character have been introduced, with the object, of locking the platform against backward movement, also to facilitate the hoisting operation, and to control the speed of descent of the platform when loaded, or otherwise. It is with the faults of the prior devices in mind that I have designed the present invention.

Another object of my invention is to provide a device of the character referred to, in which a load may be lifted, and when the desired height is reached, automatic locking means will prevent backward movement of the load. I also contemplate the provision of means to regulate the speed of descent of the load by means of the automatic lock, or by an independent braking element associated therewith, I accomplish the regulation of the lifting platform by employing a friction clutch member, which may be made to slip or release when desired, and a detent associated therewith, the association of the clutch and detent being such that the clutch may be disconnected upon elevation of the platform, and the independent brake employed to check the speed of descent; or, if desired, the clutch may be employed to check the speed of descent by "backing down" slowly on the driving element, the clutch "taking up" by friction, but not positively locking the platform against descent at such a time.

A further object of my invention is to apply the independent braking element at a point at which the same will exert the most effective, steady, and efficient braking effort, and I accomplish this by placing the brake drum and brake on the slow speed shaft, which in the present case happens to be the drum shaft, and in this way am enabled to combine the advantages of a large braking area or surface with slow speed. This also tends to make the braking operation more steady and prevents jerking of the platform during descent and consequent undue strain on the operating parts.

A further object of my invention I attain in providing means for giving two or more degrees of leverage when hoisting, and to obtain the same advantage when lowering by means of slipping the clutch.

As a more clear understanding is had of the invention from the specification and claims, it will be seen that I need not limit myself to the specific details shown; for instance, the application of the brake drum to the slow speed shaft need not be adhered to if it is found that by interposing another shaft and suitable gearing as beneficial results may be obtained therefrom.

Other objects and advantages to be derived from my invention will appear from the following description of the details thereof and the claims appended thereto, taken in connection with the accompanying drawings, in which:

Figure 1 is a fragmental side elevation of an elevator embodying the improvements of my invention;

Figure 2 is a vertical section taken on the line 2—2 of Figure 1;

Figure 3 is a view similar to Figure 1. enlarged, and portions thereof broken away; and Figure 4 is an enlarged plan view of a detail.

Referring in detail to the drawings, I have illustrated the driving mechanism and only a portion of the frame of the elevator, as the particular type of frame does not necessarily enter into the present invention.

The portion of the frame illustrated comprises a base 10 composed of angle irons and preferably rectangular in shape. The base 10 is provided with a pair of feet 11 and 12 on one end thereof, and the opposite end of the base, (not shown) is supported by a suitable roller or rollers.

The frame of the elevator comprises a pair of rear standards 13 and 14, preferably angle irons, connected adjacent their upper ends by means of a transverse strut 15, which is also angle iron. A similar pair of standards to those already described form the front portion of the frame and also the guides in which the edges of the platform (not shown) are adapted to be engaged. Only one of the front standards is shown, the same being designated 16 and comprising a channel iron. A front transverse angle iron 17 extends between the channels 16, and the upper ends of the standards 13 and 14 are connected to the channel members 16 by means of side angle irons (not shown). I do not intend to adhere strictly to the specific details of the structure described in the foregoing, as any suitable structural arrangement of the supporting frame of the elevator may be provided.

The hoisting mechanism of my invention is supported in a pair of standards comprising the front channel member 19 and a rear channel member 20, said channel members extending between the front strut 17 and the bottom front strut 21, and between the rear strut 15 and base 10, respectively. Rivets 22 and 23 serve to connect the channel 19 to the struts 17 and 21, and rivets 24 and 25 serve to connect the rear standard 20 to the strut 15 and base 10 as best shown in Figure 2.

The driving mechanism comprises a drive shaft 26, the inner end of the shaft 26 being mounted in a suitable bearing 27 secured by means of rivets 28 to the standard 19. The opposite end of the shaft 26 extends through an enlarged opening 29 in the rear standard 20. A relatively stationary clutch member 30 is provided with an extension 31 mounted in a suitable bearing 32 secured by means of rivets 33 to the standard 20. The clutch member 30 is keyed as at 34 to the shaft 26 so as to rotate therewith.

The shaft 26 carries a double clutch member 35 freely rotatable on the shaft, at times, as will hereinafter appear. The clutch member 35 is provided with two clutch faces 36 and 37 and the drum portion thereof is provided with gear teeth 38. The shaft 26 is threaded as at 39 to receive the threaded extensions 40 of another clutch member 41, a friction disc 42 being disposed at all times between the clutch face 37 of the clutch member 35 and the clutch face 41. A bearing sleeve 43 is loosely carried by the shaft and supports the disc 42 concentrically thereon, the clutch member 35 being recessed concentrically as at 44 to receive a coiled spring 45 interposed between the inner face of the recess and the sleeve 43. The sleeve 43 abuts against the adjacent end of the threaded portion of the shaft 26. A divided collar 46 is mounted on the shaft 26, said shaft being reduced to form a groove in which said collar seats, the collar 46 limiting the movement of the clutch member 41 toward the inner end of the shaft. A second collar 47 is carried by the shaft, a pin 48 serving to prevent movement of said collar on said shaft. The object of the collar 47 is to prevent endwise movement of the shaft toward the bearing 27. A ratchet wheel 49 is mounted upon and freely rotatable relative the shaft 26, said ratchet wheel being mounted between the clutch faces 30 and 36, a pair of friction discs 50 and 51 being loosely carried by the shaft and disposed between the contacting faces of the clutch members 30 and 36. The ratchet wheel 49 is provided with teeth arranged to permit movement of the shaft 26 in a clockwise direction, but to normally prevent rotation of the shaft in the opposite direction, a gravity operated pawl 52 carried by the shaft 53 engaging said ratchet teeth. The shaft 53 is stationary and is mounted in a suitable bearing portion formed in the end of the bearing member 32, said bearing member preferably comprising a casting formed with the necessary bearing openings. The shaft 53 is held against endwise movement by means of a collar 54, a disc 55 preventing endwise movement of the pawl on said shaft 53 and an extension formed on the bearing 32 serving to abut the pawl and further assist in preventing endwise movement of the shaft or pawl. The pawl is provided with peripheral extending flanges 56 which embrace the teeth of the ratchet and thereby prevent endwise movement of the same on the shaft 26. On the outer free end of the shaft 26 a gear 57 is mounted, said gear 57 having an extension 58, which is in the present instance hexagonal in shape, to receive a handle or crank 59. In Figure 2 the crank 59 is shown mounted on the shaft 53, or rather on an extension 60 of a pinion 61, the latter meshing with the gear 57. In the provision of the extension on both the pinion 61 and the gear 57 I am enabled to obtain two degrees of power in driving the shaft 26. If desired another pinion or idler might be inserted between the gear 57 and the pinion 61 so that the direction of the pinion and of said gear would be the same. However, this is not essential and has therefore not been shown. A collar 62 is mounted adjacent the outer end of the shaft 26 and the clutch member 31 is adapted to abut the same, a suitable groove being formed in the shaft 26 to receive said collar.

This provides for a reduction in the drive of the shaft 26 which is feasible when in the handling of heavy loads, low speed is desirable. In order to secure the greatest efficiency not only with respect to the minimum effort required but also with respect to the speed at which the load should rise, I propose making the pinion 61 interchangeable with the gear 57 and thereby obtain an increased drive. To secure an intermediate drive the handle 59 may be mounted directly on the shaft 26, with the sleeve 58 of the gear 57, of course, interposed.

Motion is imparted from the shaft 26 to the drum shaft 63 by a gear 64, the latter meshing with the gear teeth 38 formed in the drum portion 35 of the clutch carried on said shaft 26. The gear 64 is keyed as at 65 to said drum shaft 63, the latter being mounted in suitable bearings 66 and 67, riveted to the front and rear standards 19 and 20. The gear 64 carries a drum 68 provided with a spiral groove 69 to receive the cable 70 of the elevator. Bolts or the like 71 serve to connect the drum 68 to said gear 64.

From the foregoing description it will be apparent that the shaft 26 may be termed a high speed shaft and the shaft 63 a low speed shaft, and in order to attain the smooth and effective braking function I mount a brake drum 72 on the shaft 63, the key 65 of the gear 64 being extended to key said brake drum on said shaft 63. A suitable brake rod 73 is mounted in bearings 74—75—76, said bearings being suitably supported upon the rear standard 20. The rod 73 is provided with screw portions 77 and 78 of opposite pitch and direction, the screw portions extending through the brake shoes 79 and 80, respectively, said shoes being mounted on the free end of the brake band 81 and riveted thereto as at 82. Screw blocks 83 are carried by the shoes 79 and 80 and engage the respective threaded portions of the rod 73, and a pair of collars 84 and 85 abut the bearings 75 and 76, respectively, and prevent endwise movement of the rod in said bearings.

In order to regulate the application of the brake I provide a circular rack 86 mounted on the rear strut 15 in any suitable manner, and held thereon against rotation. The upper end of the rod 73 projects beyond the rack 86 and carries a collar 87 having a lever 89 pivotally mounted at 90 thereon, the lever having a toothed extension 91 adapted to seat in the teeth of the rack 86 for retaining the lever 89 in the position in which the same may be set.

Because of the inherent danger attached to the operation of hoists of this character, due chiefly to the liability of the brake to fail to act quickly and positively, it is essential that as large a braking surface as possible be obtained. To this end, the brake drum is preferably mounted upon the low speed shaft, or cable drum shaft, which is necessarily the larger in diameter and consequently permits of a larger diameter of the brake drum and also a larger braking surface. This will give the handle 89 a greater range of movement and allow the operator to have perfect control as the brake will have greater limits in which to act. Further, due to the ability to apply the braking effort gradually, a much better control is had and smooth operation results. Also, a larger braking surface is thereby provided and a positive gripping of the brake surfaces is had as soon as the lever 89 reaches the proper adjustment. The result is better operation even in the hands of an unskilled operator.

In order to facilitate transporting of the elevator from place to place I provide a casting 92 formed with a bearing 93 adapted to receive a stud 94. A yoke 95 is pivotally mounted at 96 on the lower end of the stud 94, and the roller 97 is mounted for rotation in said yoke 95, on a shaft 98. A suitable extension 99 is formed on the yoke to receive an arm 100, the upper free end of which is provided with a handle 101. When in the position as shown in Figures 1 and 2, that is, the non-transporting position, the handle 101 embraces the ends of the shafts 26 and 53, but is a sufficient distance from said shaft to permit application of the crank to one or the other of the same as may be desired. When it is desired to transport the elevator the arm 101 is swung down to a sufficient angle to throw the roller into contact with the floor and raise the base 10 off the seats 11 and 12.

The operation of my invention is as follows: Assuming that the platform is down, and it is desired to raise the same, motion in a clockwise direction is applied to the shaft 26 by means of the crank 59, the same being shown as applied to the shaft 53 in Figure 2. Rotation of the shaft 26 causes the screw portion 39 thereof to function for causing the clutch member 41 to move outwardly on said shaft, forcing the friction discs 42, 50, 51, clutch members 35 and 30, and ratchet 49 to engage and rotate clockwise as a single unit. Motion of the clutch element 35 imparts motion to the gear 64 and drum 68, in the present instance counter clockwise, to wind the cable on the drum and raise the platform. Endwise movement of the clutch member 30 on the shaft 26 is prevented by abutment of said member with the collar 62. It will be apparent that the heavier the load to be lifted the greater the gripping effect of the clutch sections on the shaft 26. Therefore, the only limit on the weight to be lifted is the strength of materials and the power supplied.

The pawl and ratchet serves to prevent the platform from descending after it is elevated to the desired height without regard to whether the handle 59 is held from reverse rotation, that is, the pawl automatically cooperates with the ratchet to prevent reverse rotation of the shaft 26, while the various clutching elements are locked together as one unit.

When it is desired to lower the platform, assuming that the same is in the raised position, the independent brake is applied by lifting the brake lever 89 and turning the brake rod 89 to the right, in Figure 3. Then a turn or two of the shaft 26 counter clockwise until the clutch section 41 abuts the collar 46, will disengage the clutch sections and lowering of the platform may be controlled by the brake.

The platform may be lowered by reversing the direction of rotation of the shaft 26 if so desired. By imparting a half turn to the shaft 26 in a counter clockwise direction the clutch section 41 will be backed away from the section 35 slightly, permitting the same to slip the friction disc 50, and the weight of the platform will act to cause the same to descend, the frictional engagement of the member 35 with the member 41 acting to brake the speed of descent.

It will be apparent from the foregoing that during the elevating operation should the operator let go the handle of the machine the platform would be automatically locked in whatever position the same happened to be at that time. This would prevent the occurrence of accidents and render it practically impossible for the platform to drop with a load, due to slippage of the clutch, as the groove arrangement compensates for wear on the friction discs and other parts.

I do not limit myself to the application of the device as described, as the same might as readily be applied to other types of hoisting machinery, but owing to the flexibility of the device of my invention and its peculiar adaptability to portable elevators I have described the same as so applied. It will also be readily apparent that my invention is not limited in the use of hand power, as by slight modification an electric motor or the like may be easily connected with the mechanism.

I claim:

1. In combination, a drive shaft and a driven shaft, means for transmitting motion to said drive shaft at a reduced speed, a loosely mounted gear on the drive shaft, a plurality of frictional elements adapted to be drawn up against said gear by movement of the drive shaft for rotation with the same, a drum gear on said driven shaft having operable engagement with said loosely mounted gear, and brake mechanism for retarding the reverse rotation of said driven shaft, said brake mechanism operated independently of the loosely mounted gear.

2. In combination, a drive shaft, a driven shaft and operable driving connection directly between the two, a countershaft adjacent the drive shaft, an operable drive arranged to provide various speeds between the drive shaft and counter shaft, a winding drum on the driven shaft, and brake mechanism on the driven shaft, adapted independently to operate the same irrespective of the condition of the driving connection between it and the drive shaft.

3. In combination, a relatively high speed shaft, a low speed shaft, means permitting transmission of motion in one direction between said shafts, means for rendering inoperative said means, and braking mechanism independent of said transmission means for governing the retrograde motion of said low speed shaft.

4. In combination, a relatively high speed driving shaft, a relatively low speed driven shaft, means interconnecting said high and low speed shafts, means for delivering motion from one of the shafts to the other in one direction only and for operatively disconnecting said shafts and brake mechanism independent of the condition of said interconnecting means for controlling the rotation of said low speed shaft.

5. In combination, a high speed drive shaft, a low speed driven shaft, means for delivering motion in one direction from the drive to the driven shaft, said means automatically locking said shafts against retrograde movement, means for permitting limited movement of said shafts in the opposite direction, and brake mechanism independent of the condition of said means delivering motion in the first mentioned direction said brake mechanism operable to control said driven shaft after limited movement of said shaft is obtained.

6. In combination, driving and driven elements of relatively different speeds, the driven element having the lower speed, means permitting motion of said elements in one direction only, means for rendering inoperative said first means, said first means being operable to permit limited movement of the elements in the opposite direction, and a braking element independent of said means permitting motion of the shaft as first mentioned, said braking element operable to control said driven element irrespective of the condition of the last referred to means.

7. In combination, a frame, a driving shaft, a clutch section and a ratchet freely rotatable on said drive shaft, means for engaging said clutch section and ratchet with the shaft to permit rotation of the shaft and clutch in one direction only, the driven shaft operatively connected with said clutch section, and a brake operable to control directly said driven shaft irrespective of the condition of said clutch section.

8. In combination, a frame, a relatively high speed driving shaft, a clutch section and a ratchet freely rotatable on said drive shaft, a relatively low speed driven shaft operatively connected with said clutch section, means for causing the clutch section to rotate with the drive shaft in either direction, and means for causing said ratchet to rotate on said shaft in one direction only, and brake means on said low speed shaft independent of and operable irrespective of the condition of said clutch section relative to said high speed shaft.

9. In combination, a frame, a relatively high speed driving shaft, a clutch section and a ratchet on said drive shaft, said ratchet adapted to rotate with the shaft and clutch section in one direction and preventing retrograde rotation, means for disengaging the clutch section from said ratchet for permitting restricted rotation of the clutch section and shaft in the opposite direction, a relatively low speed shaft connected with said clutch section, and braking means on said slow speed shaft independent of said clutch section and arranged to operate irrespective of the relative condition of the same.

10. In combination, a driving and a driven shaft, the latter adapted to have a load applied thereto, means for imparting rotation in one direction to said driven shaft, and preventing rotation in the opposite direction, means for actuating said first means for permitting retrograde movement of said driven shaft of restricted speed under influence of the load, a brake on said driven shaft, and means for rendering said movement imparting means inoperative by releasing said driving shaft and rotation imparting means whereupon the brake may be applied without regard to the condition of the former.

11. In combination, a drive shaft, a driven shaft, means on the drive shaft for controlling the direction of rotation of the same, a clutch on said driven shaft, means for bringing said clutch into engagement with said direction controlling means to impart motion to the clutch in one direction only, friction means between the clutch and said controlling means, said clutch operating means being operable for permitting slippage of the clutch, said clutch being operatively engaged with said driven shaft, and a brake on the driven shaft for thereafter controlling directly the reverse rotation of the same.

12. In combination, a frame, a drive shaft, a clutch on the drive shaft comprising a drum section, a clutch member keyed to the drive shaft, a second clutch member relatively movable on said counter shaft to engage the drum, the drum being situated between said clutch members, a ratchet for preventing retrograde movement of said drive shaft engageable therewith upon engagement of said clutch drum with said clutch section, a drum shaft having a cable drum thereon, means for imparting motion between the clutch and the drum shaft, and a brake on the drum shaft for directly controlling the same and being independent of said clutch on the drive shaft.

13. In a hoist, the combination of a vertical frame for carrying a platform adapted to be raised and lowered, a horizontal frame for carrying mechanism for raising and lowering the platform, a brake for controlling the descent of said platform, a vertical member at one side of said horizontal frame cooperating with said brake, and means associated with said vertical member for locking the same in various positions whereby the brake will positively control the movement of said platform.

14. In a hoist, the combination of a vertical frame for carrying a platform adapted to be raised and lowered, a horizontal frame for carrying mechanism for raising and lowering the platform, a brake for controlling the descent of said platform, a shaft for carrying the bands of said brake, and locking means at one end of said shaft for varying and positively holding said brake in adjusted positions whereby the control of the platform descent will be obtained.

15. In a hoist, the combination of a frame, a drive shaft, a driven shaft and an operable driving connection between the two shafts, a brake drum carried on said driven shaft, a third shaft disposed perpendicular to the driven shaft and provided with threaded portions, brake shoes having internally threaded members cooperating with the said threaded portions, a rack at one end of said third shaft, and a handle being provided with a pawl for controlling the movement of said third shaft, whereby the degree of engagement of said shoes with the brake drum may be varied.

16. In combination, a driving shaft and a driven shaft, a gear on said driven shaft being provided with a frictional engaging surface at each end, clutch members adjacent said friction surfaces, one of said clutch members having positive traveling movement on the drive shaft as the same is rotated, said traveling movement causing engagement of the clutch members with said friction surfaces whereby said gear is rotatively locked on said drive shaft, said traveling movement also causing disengagement of the clutch members with the friction surfaces, said drive shaft being arranged so that said last traveling movement prevents binding of the drive shaft, and a co-operating gear on said driven shaft.

In witness whereof, I hereunto subscribe my name this 24 day of January, A. D. 1920.

LAWRENCE V. FRALEY.